United States Patent [19]

Spidel

[11] Patent Number: 4,789,120

[45] Date of Patent: Dec. 6, 1988

[54] CARRIER TRACK SYSTEM FOR EXTENSIBLE AND RETRACTABLE BOOM MACHINES

[75] Inventor: Jeffrey L. Spidel, Chambersburg, Pa.

[73] Assignee: Kidde, Inc., Saddle Brook, N.J.

[21] Appl. No.: 844,671

[22] Filed: Mar. 27, 1986

[51] Int. Cl.⁴ .................. H02G 11/00; E04H 12/34

[52] U.S. Cl. .................. 248/49; 212/267; 182/141; 52/118

[58] Field of Search .................. 52/118, 119; 212/267; 182/2, 141; 248/49, 51, 55; 414/718

[56] References Cited

U.S. PATENT DOCUMENTS

| | | | |
|---|---|---|---|
| D. 224,129 | 7/1972 | Sterner | 212/267 X |
| 2,864,907 | 12/1958 | Waninger | 248/49 |
| 3,157,376 | 11/1964 | Merker et al. | 248/49 |
| 3,284,036 | 11/1966 | Nansel | 248/49 |
| 3,371,801 | 3/1968 | Widegren | 212/267 |
| 3,423,890 | 1/1960 | Leigh | 52/118 |
| 3,480,109 | 11/1969 | Eitel et al. | 212/267 X |
| 3,516,553 | 6/1970 | Reske | 52/118 |
| 3,516,554 | 6/1970 | Nakamura | 212/267 |
| 3,776,367 | 12/1973 | Grove | 182/2 |
| 3,800,965 | 4/1974 | Barron et al. | 52/118 X |
| 4,027,448 | 6/1977 | Tymciurck | 212/267 X |
| 4,129,277 | 12/1978 | Tenniswood | 248/49 X |
| 4,156,331 | 5/1979 | Lester et al. | 52/118 X |
| 4,206,833 | 6/1980 | Goyarts | 212/267 X |
| 4,272,932 | 6/1981 | Wappler | 52/118 |
| 4,314,622 | 2/1982 | Lindquist | 182/2 |
| 4,327,533 | 5/1982 | Sterner | 212/267 X |
| 4,360,077 | 11/1982 | Abbott | 182/2 |
| 4,392,573 | 7/1983 | Gyomrey | 212/267 X |
| 4,483,109 | 11/1984 | MacDonald et al. | 212/267 X |
| 4,468,166 | 8/1984 | Jameson | 212/267 X |
| 4,470,229 | 9/1984 | Muse et al. | 52/118 |
| 4,575,976 | 3/1986 | McDermott et al. | 212/268 X |
| 4,582,206 | 4/1986 | Johnson | 212/267 X |

FOREIGN PATENT DOCUMENTS

| | | | |
|---|---|---|---|
| 52541 | 8/1944 | France | 52/118 |

*Primary Examiner*—Randolph A. Reese
*Assistant Examiner*—Peter M. Cuomo
*Attorney, Agent, or Firm*—Brady, O'Boyle & Gates

[57] ABSTRACT

To guide and restrain essential hoses and cables of telescoping boom machines, a carrier track system for the hoses and cables is provided in which all parts of the flexible carrier track are supported during extension and retraction of the telescoping boom. The system includes a stiff leg attached to the forward end of the boom fly section and extending rearwardly thereof and engaging a guiding and restraining device on the forward end of a carrier track bridge attached to the forward end of the boom mid-section and extending rearwardly thereof and engaging a restraining and guiding device on the forward end of the boom base section. The rear of the bridge carries a guide roller assembly which engages the bight portion of the flexible carrier track which is connected between the stiff leg and the forward end of the boom base section. Spaced support rollers on the top of the bridge engage and support the stiff leg and the top stretch of the flexible carrier track along its entire length. The bottom stretch of the flexible carrier track is supported along its entire length by spaced support elements along the bottom of the boom base section. The rear end of the bridge is supported through its attached guide roller assembly on the supported lower stretch of the flexible carrier track.

22 Claims, 5 Drawing Sheets

CARRIER TRACK SYSTEM FOR EXTENSIBLE AND RETRACTABLE BOOM MACHINES

BACKGROUND OF THE INVENTION

1. Technical Field:

The present invention relates to an improved guide and restraint system for flexible hoses and cables employed on telescoping boom machines, such as aerial work platforms.

2. The Prior Art:

In the prior art, flexible carrier track arrangements for hoses and cables found on telescoping boom machines are known. However, such prior art systems have been severely limited by the inability of the flexible track element to be unsupported in the system over more than a limited length of approximately twenty-nine feet in the case of the largest cross section flexible track suitable for use on telescoping booms. Smaller cross section flexible track is even more severely limited in terms of its maximum unsupported length which will resist buckling or collapsing under load.

Various constructions have been proposed in the prior art to assist in supporting either the upper or lower stretch of a flexible carrier track used to support hoses and cables on a multi-section telescoping boom. However, none of the prior art proposals has successfully dealt with the above inherent limitation of the flexible track whereby the track cannot adequately support itself over distances greater than about twenty-nine feet. Accordingly, it is a main object of the present invention to remove this limitation of the prior art through the provision of a single power track sytem for hoses and cables of telescoping boom machines in which a flexible track having a length substantially greater than twenty-nine feet is successfully employed.

SUMMARY OF THE INVENTION

The present invention can be summarized in a single power track system reaching from the forward tip of the fly section of a multi-section telescoping boom to the base section of the boom in which all portions of the flexible carrier track are adequately supported at all times during the extension and retraction of the boom in an efficient, compact and economical manner. A stiff leg attached at its forward end to the leading end of the boom fly section extends rearwardly and engages a guiding and restraining device on the forward end of a carrier track bridge, attached at its forward end to the leading end of the boom mid-section and extending rearwardly thereof. The bridge, in turn, engages a guiding and restraining device on the forward end of the boom base section and carries at its rear end a guide roller assembly which engages a bight portion of the flexible carrier track which has its forward end connected to the rear end of the stiff leg and its rear end connected to the restraining and guiding device for the bridge on the forward end of the boom base section.

Spaced support rollers on the top of the bridge engage and support the stiff leg and the top stretch of the flexible carrier track in all adjusted positions of the latter. The bottom stretch of the flexible carrier track is also firmly supported in all adjusted positions by spaced support elements along the bottom of the boom base section. The rear end of the bridge is supported on the lower stretch of the flexible carrier track through its attached rear end guide roller assembly.

Other features and advantages of the present invention will become apparent to those skilled in the art during the course of the following detailed description.

DETAILED DESCRIPTION

Figure 1:
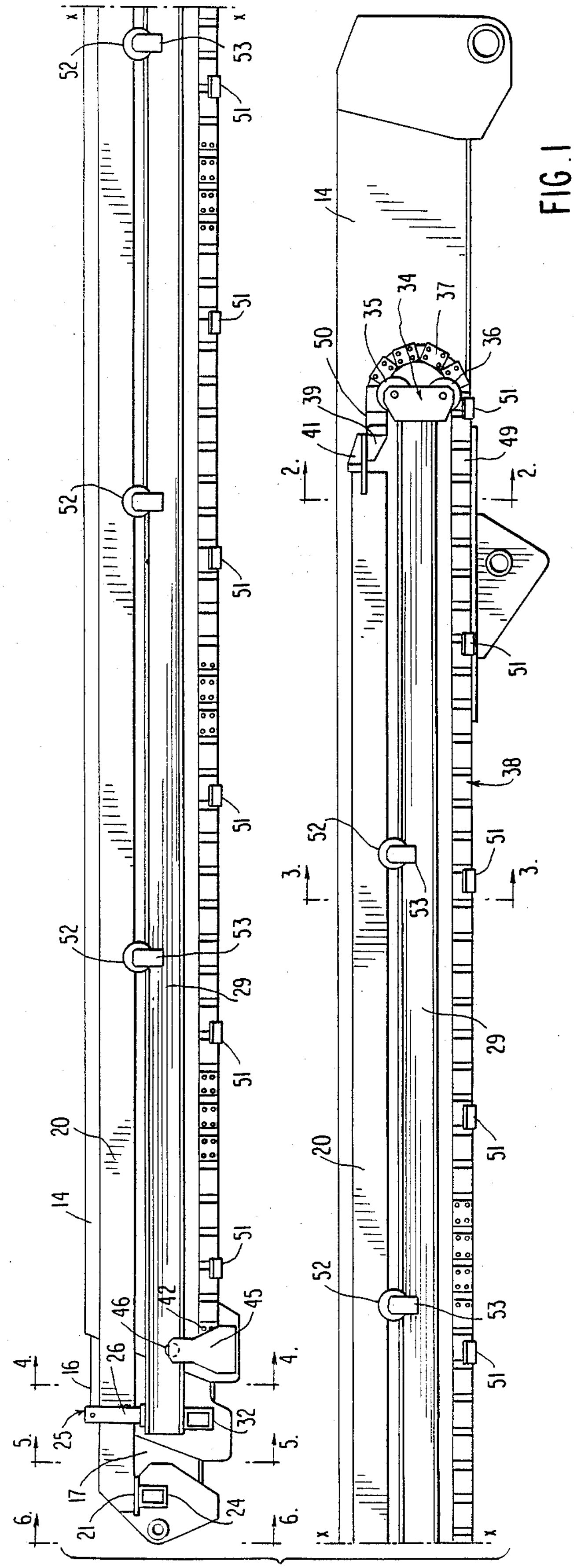
FIG. 1 is a side elevation of a multi-section telescoping boom equipped with a carrier track system in accordance with the present invention, the boom being fully retracted, and the drawing figure consisting of two portions which are joined longitudinally on the match line X—X.
Figure 4A:
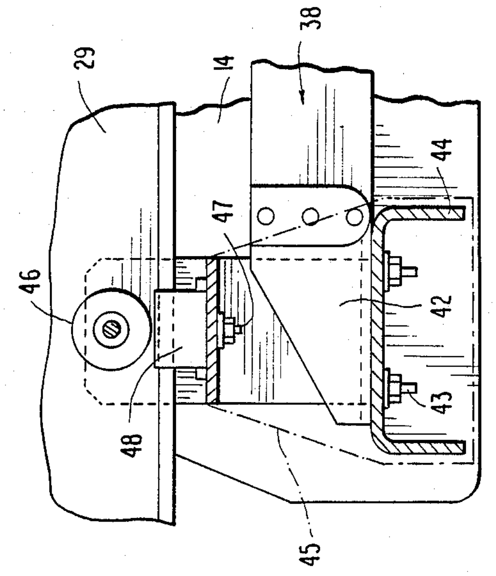
FIG. 4A is a fragmentary vertical section taken on line 4A—4A of FIG. 4.

Referring to the drawings in detail wherein like numerals designate like parts, a self-propelled aerial work platform is illustrated in the drawings and it should be understood that the present invention is not limited in its application to this particular type of machine and may be employed on other forms of multi-section telescoping boom machines.

The machine comprises a self-propelled steerable vehicular base 10 having a turntable 11 on which is mounted a horizontally turnable body portion 12 carrying a pivot 13 for a boom base section 14 which is raised and lowered by a luffing cylinder 15. The boom of the machine further comprises a boom mid-section 16 and a boom fly section 17, the three boom sections having telescoping guided engagement in a conventional manner. A worker platform 18 is carried by the leading end of the boom fly section 17 and is equipped with conventional means 19 operable to maintain the worker platform 18 in all adjusted positions of the telescoping boom. The movement and steering of the vehicular base 10, the luffing and sluing of the boom and the extension and retraction of the boom are all conventional and controlled by the worker on the platform 18, which platform is equipped with conventional controls forming no part of the present invention. In the particular machine illustrated in the drawings, the boom mid-section and fly section 17 are simultaneously extended and retracted relative to the base section 14 and relative to each other. The three telescoping boom sections, therefore, have equal relative movements longitudinally during extension and retraction of the boom by the piston-cylinder assembly and other related means, and are not operated sequentially as occurs in many machines.

Figure 8:
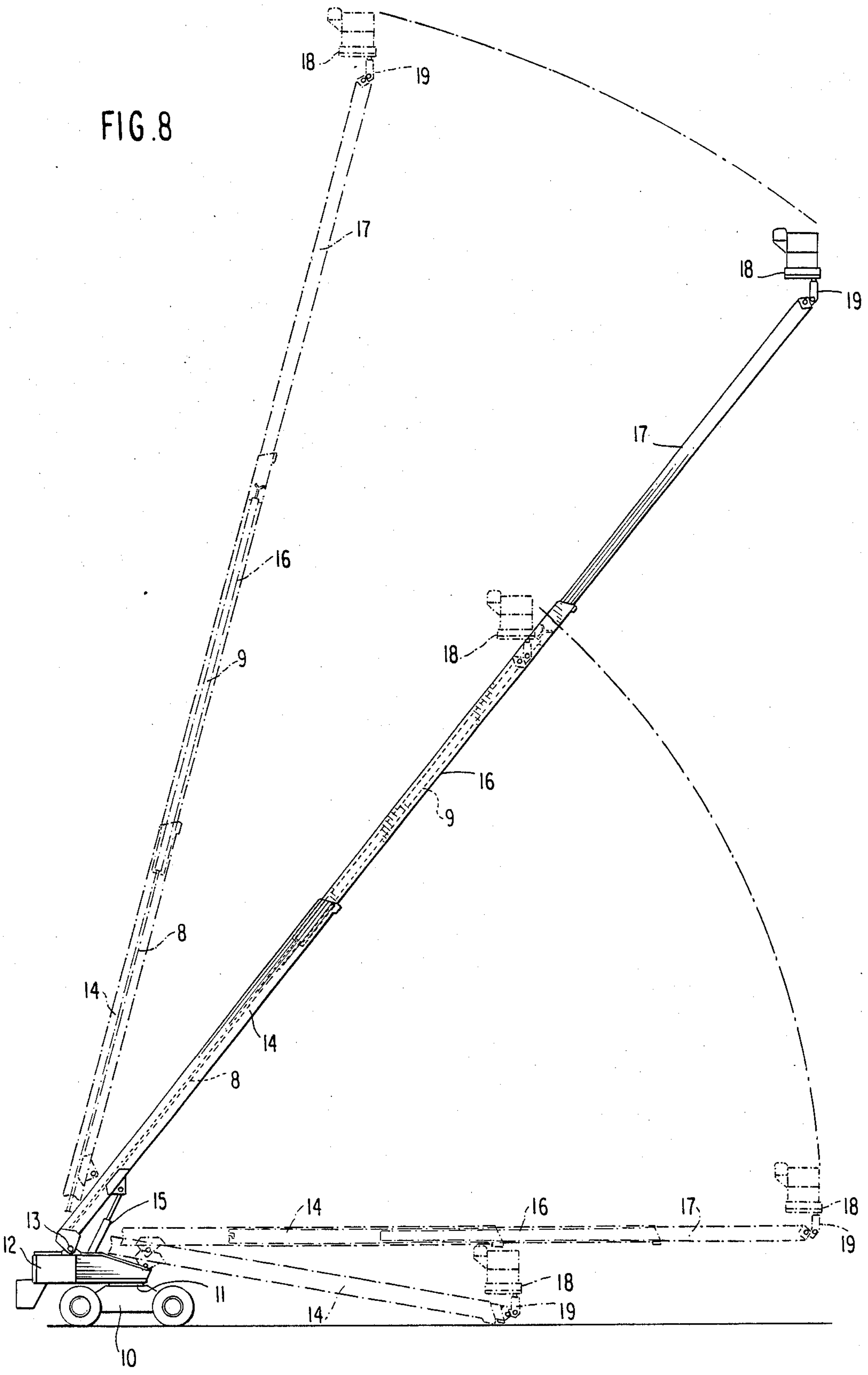
FIG. 8 is a side elevation on a reduced scale of a multi-section telescoping boom machine according to the present invention showing approximately the correct dimensional proportions of the machine components, the machine boom being depicted in several longitudinally and angularly adjusted positions.

Referring to FIG. 8 which reflects approximately the true proportions of the machine, typically the fully extended three section telescoping boom may have a length of about one hundred and five feet. The boom sections 14, 16 and 17 typically measure thirty-eight feet each and the fully retracted length of the boom is therefore about forty feet. These dimensions are approximate and are provided for example only, and may be much greater in other machines.

Figure 6:
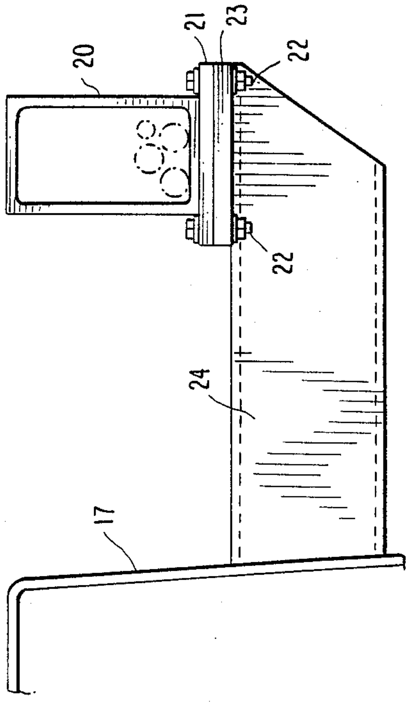
FIG. 6 is an enlarged fragmentary end elevation taken on line 6—6 of FIG. 1.

Continuing to refer to the drawings in greater detail, a rigid leg 20 preferably in the form of a rectangular tube has its forward end equipped with a fixed base plate 21 attached by bolts 22 to an opposing mounting plate 23 fixed to the top and outer end of a lateral support arm 24 projecting outwardly from one side of the boom fly section 17, FIG. 6. As shown in FIG. 6, the tubular leg 20 receives therethrough the various hoses and electrical cables essential to the operation of the machine, and prevents undesirable twisting, entangling or kinking of the hoses and cables.

Figure 5A:
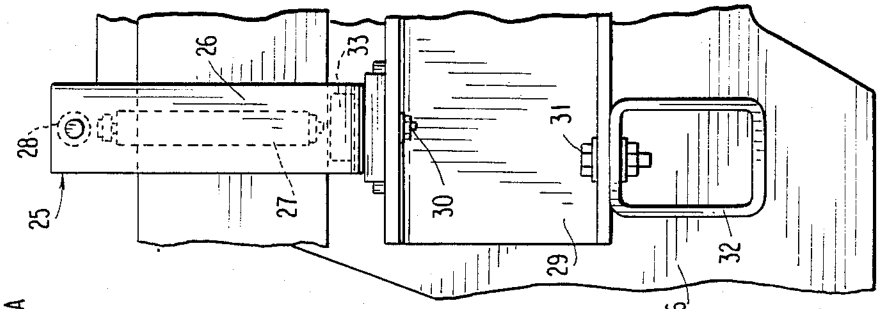
FIG. 5A is a fragmentary side elevation taken on line 5A—5A of FIG. 5.
Figure 5:
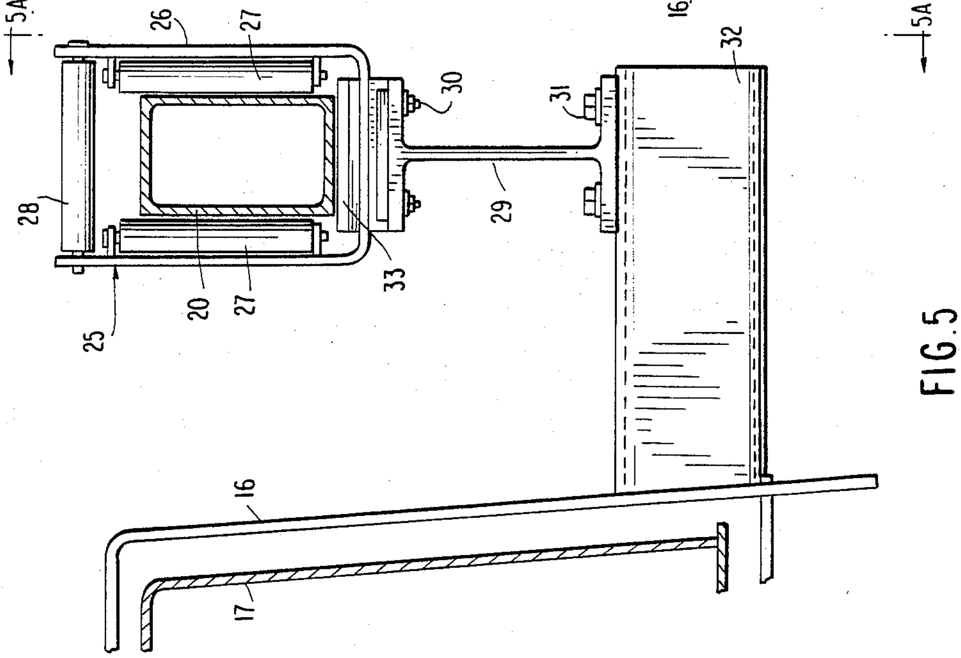
FIG. 5 is an enlarged transverse vertical section taken on line 5—5 of FIG. 1.

The rigid leg 20 extends cantilever-fashion along the full length of the boom fly section 17 and is guidingly and supportingly engaged with a device 25, FIG. 5, fixed to the forward end of the boom mid-section 16. This device comprises a U-bracket 26 carrying within it a pair of vertical axis opposite side guide rollers 27 for the rigid leg 20 and a top horizontal axis retention roller 28 for the leg 20 so that the latter cannot rise out of engagement with the device 25.

The forward end of a flexible carrier track bridge 29, preferably of I-beam form, and forming a very important component of the present invention, is attached by bolt means 30 to the bottom of the U-bracket 26 and is also attached at its bottom by bolt means 31 to a laterally extending rigid support arm 32, FIG. 5, projecting outwardly from the adjacent side wall of the boom mid-section 16.

The device 25 also includes within the bracket 26 a wear pad 33 for the bottom face of the rigid leg 20 during longitudinal guided movement of the latter with the boom fly section 17 relative to the mid-seciton 16.

Figure 7:
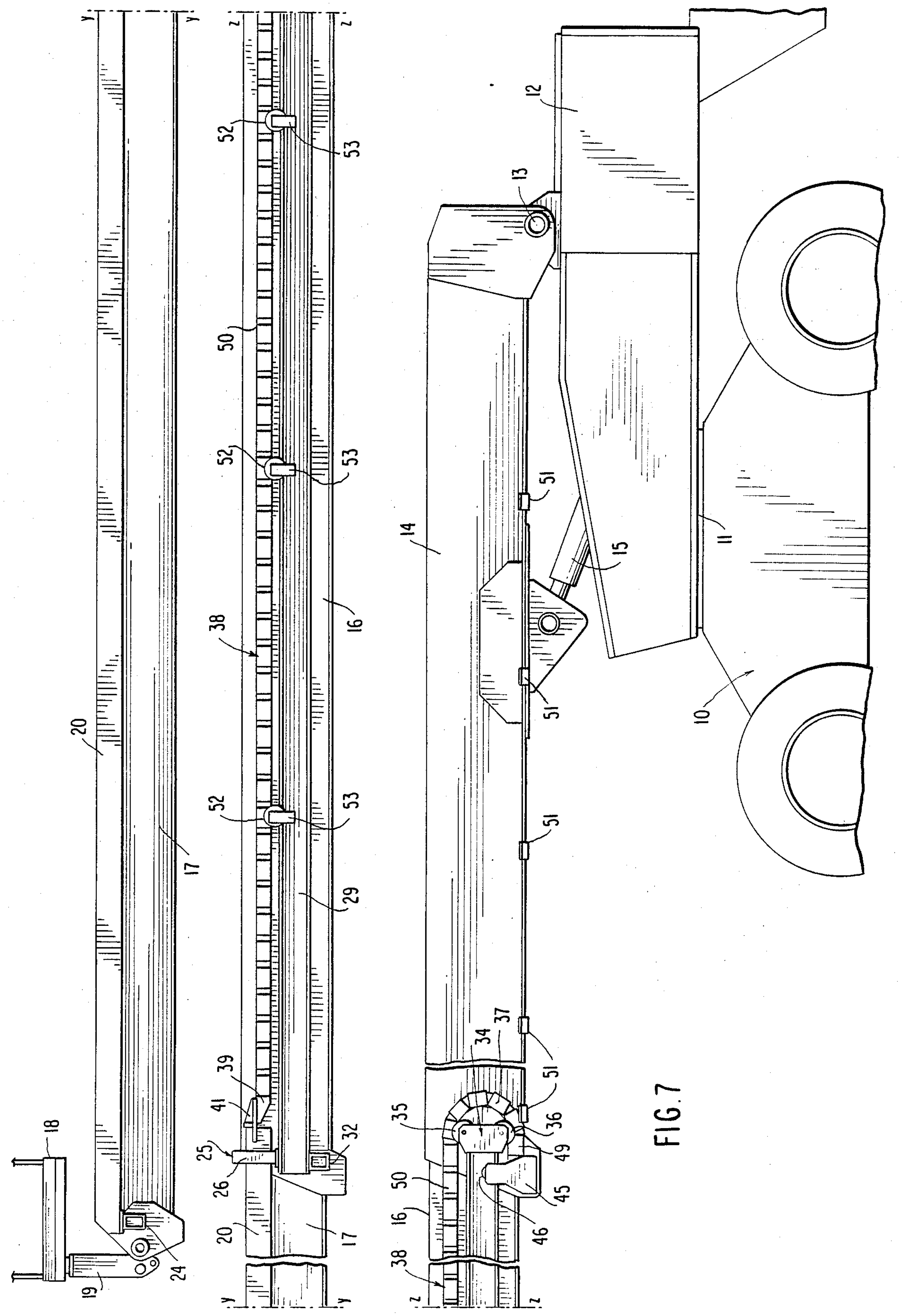
FIG. 7 is a side elevation of the boom and carrier track system with the boom fully extended and showing the vehicular support for the boom, the drawing figure being in three portions which are connected longitudinally on the match lines Y—Y and Z—Z.

The carrier track bridge 29 extends cantilever-fashion from the forward end of the boom mid-section 16 along the length of the mid-section when the boom is fully extended as shown in FIG. 7. At its rearward end, the bridge 29 has fixed thereto a guide and support roller assembly 34 including upper and lower parallel axis rollers 35 and 36 which engage the interior of a rolling bight portion 37 of a length of flexible carrier track 38 preferably of the type disclosed in U.S. Pat. No. 4,129,277 to Tenniswood or an equivalent type of flexible carrier track.

Figure 2:
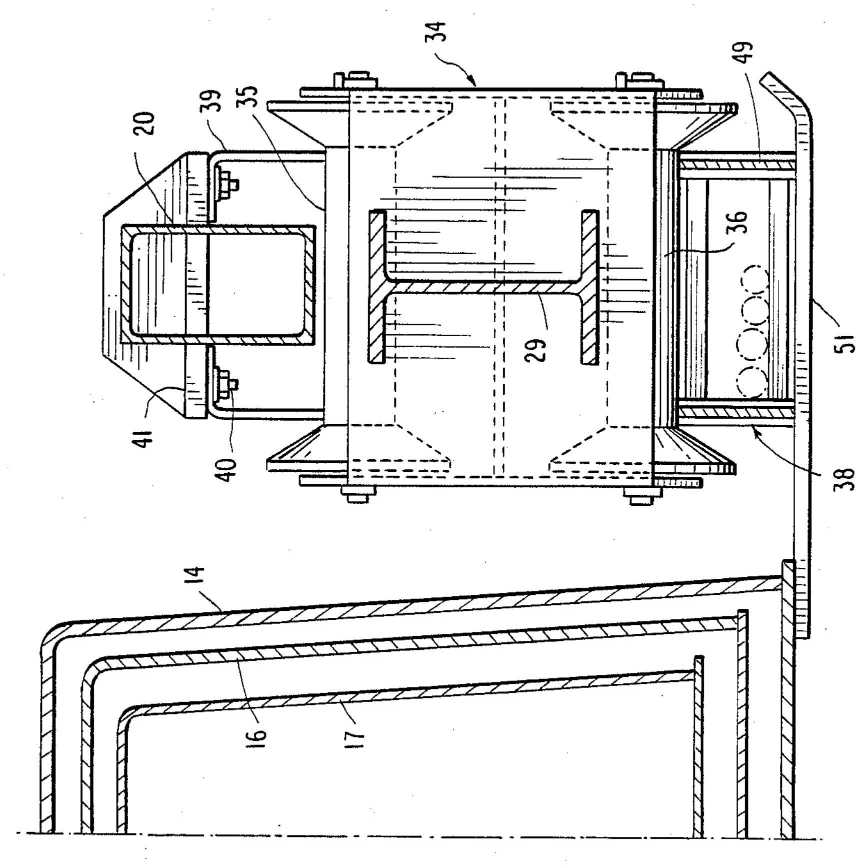
FIG. 2 is an enlarged transverse vertical section taken on line 2—2 of FIG. 1.

As shown in FIGS. 1, 2 and 7, an end link 39 of the carrier track 38 is attached by bolt means 40 to a bracket 41 fixed to the rear end of the rigid leg 20. The other end of the flexible carrier track 38 has an end link 42 thereof attached by bolts 43 to a rigid support arm 44 projecting laterally from the adjacent side wall of the boom base section 14, FIG. 4.

Also fixed on the support arm 44 rigidly is an inverted U-mounting bracket 45, bridging the end link 42 and supporting on its top a pair of guide and retention rollers 46 for the movable bridge 29. Also fixed to the top of the bracket 45 as by bolt means 47 is a wear pad 48 for the bottom face of the bridge 29.

It can now be noted that in accordance with a very unique feature of the invention the rear end of the bridge 29 is supported on the lower stretch 49 of the flexible carrier track 38 through the lower roller 36, while the top stretch 50 of the flexible carrier track is engaged supportively with the upper roller 35 of the dual roller assembly 34 on the rear of the bridge 29.

Figure 3:
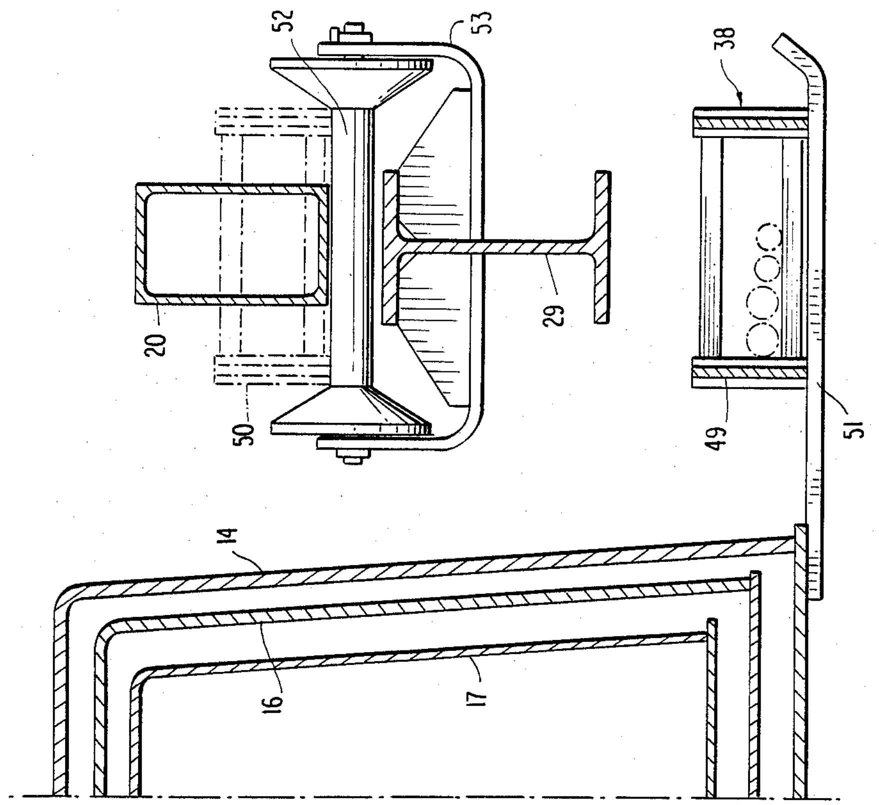
FIG. 3 is a similar section taken on line 3—3 of FIG. 1.

Moreover, the entire bottom stretch 49 of the carrier track is supported along its length when the boom is fully retracted, FIG. 1, by a series of support plates 51 projecting laterally outwardly from one side of the boom base section as shown in FIGS. 2 and 3.

Similarly, means are provided to support the top stretch 50 of the flexible carrier track 38 along its entire length where the multi-section boom is extended, FIG. 7. This means comprises a series of spaced transverse axis support rollers 52 held by brackets 53, fixed on the bridge 29, as shown. The support rollers 52 are adapted to engage and support the upper stretch 50 of the flexible carrier track as the boom becomes extended and to engage and support the stiff leg 20, FIG. 1, as the boom is retracted. In FIG. 3, the stiff leg 20 is shown riding on the support rollers 52, and the upper stretch 50 of the carrier track is shown in phantom lines only, FIG. 3, in the position it assumes above the rollers 52 as the boom is extended, FIG. 7. Thus, regardless of the relative lengths of the top and bottom stretches 50 and 49 of the flexible carrier track 38, both stretches are fully supported at all times. Moreover, the rear end roller assembly 34 of the bridge 29 is always in engagement with the rolling bight portion 37 of the flexible carrier track, as explained previously, and the bottom stretch 49 of the carrier track is always supporting the rear end of the moving bridge 29.

The same hoses and cables received by the tubular rigid leg 20 are also received in the flexible carrier track 38, as indicated in FIGS. 2 and 3.

As the multi-section boom extends or retracts by operation of the piston-cylinders assembly 8, 9 and related means, in the previously-described manner, the moving bridge 29 connected with the forward end of the boom mid-section 16 is always adjusted forwardly or rearwardly to lend support to the upper stretch 50 of the flexible carrier track and/or to the rigid leg 20. It is believed that the construction and operation of the carrier track 38 during extension and retraction of the boom has now been made clear.

During extension and retraction of the boom, the rigid leg 20 is always engaged with the device 25 on top of the bridge 29 at the forward end of the latter. The side rollers 27 of this device guide the leg 20 in its forward and rear movement while the wear pad 33 supports the leg. During transport of the machine on its self-propelled base 10, the rollers 27 stabilize the leg 20 laterally, and the upper transverse roller 28 limits upward movement of the leg 20 during transport. The leg is restrained and guided in all directions.

Figure 4:
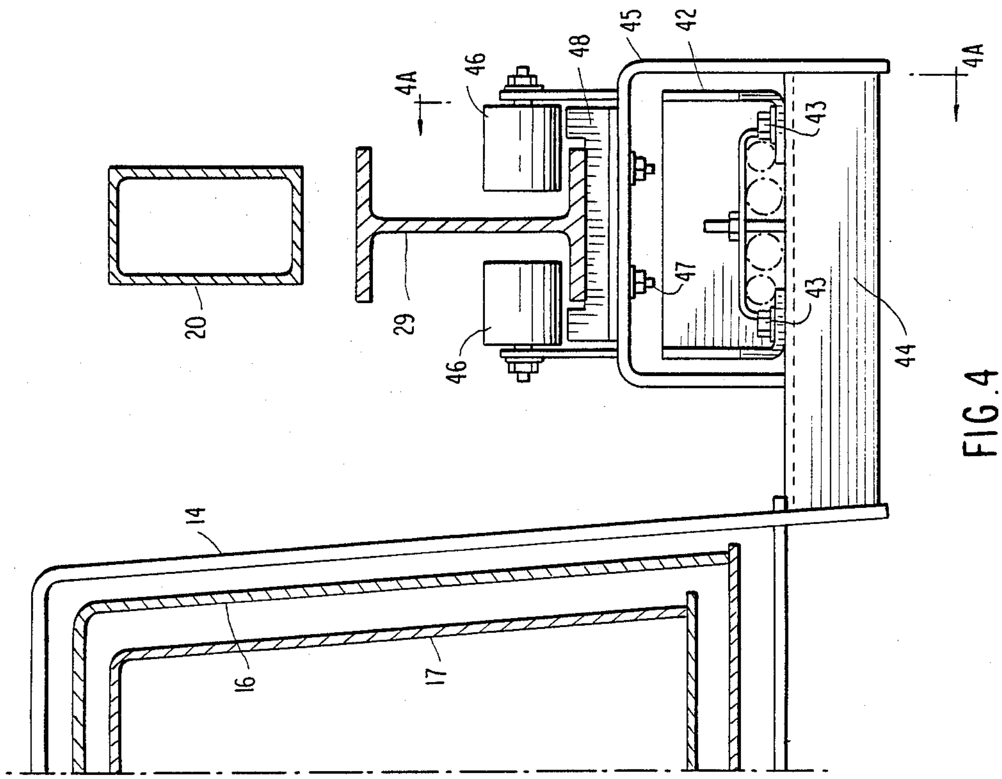
FIG. 4 is a similar section taken on line 4—4 of FIG. 1.

Similarly, the movable bridge 29 is always engaged at its bottom with the wear pad 48, FIG. 4, and the two guide and restraining rollers 46 fixed on the forward end of the boom base section 14 by the bracket 45. The recessed wear pad 48 imparts lateral stability to the bridge 29 and the two rollers 46 which straddle the center longitudinal web of the I-beam bridge restrict vertical displacement of the bridge during transport. All relatively movable components of the system are therefore positively guided during their movements and restrained against lateral and vertical displacement.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. In a carrier track system for a multi-section extensible and retractable structure having at least a pair of relatively movable sections separated by intermediate relatively movable section means, comprising,
 a single length of flexible carrier track having its opposite ends connected between the pair of relatively movable sections of the extensible and retractable structure and spanning said intermediate relatively movable section means of the extensible and retractable structure, said flexible carrier track having a rolling portion and spaced substantially parallel top and bottom stretches which vary in their lengths in response to extension and retraction of said structure,
 first support means connected on and movable with the intermediate relatively movable section means engaging and supporting said top stretch substantially along its entire length in all adjusted positions of the flexible carrier track with said extensible and retractable structure, and second support means connected on one section of the pair of relatively movable sections of said structure, engaging and supporting said bottom parallel stretch substantially along its entire length in all adjusted positions of the flexible carrier track with said extensible and retractable structure.

2. In an aerial work platform or the like,
 a multi-section telescoping boom including telescopically interfitting base, mid and fly boom sections,
 a carrier track system for the support and orientation of flexible hoses and cables arranged exteriorly of the telescoping boom along one side thereof and comprising
 a rigid leg having a forward end portion attached to the boom fly section near the forward end of the latter and extending rearwardly of such forward end,
 a bridge member having a forward end portion attached to the boom mid-section near the forward end of the latter and extending rearwardly of such forward end, the bridge member being disposed at an elevation below the rigid leg,
 a single flexible carrier track section having a forward end attached to a rear end portion of the rigid leg, a rolling bight portion and a rear end attached to the boom base section, said flexible carrier track section being disposed in a vertical plane common to the rigid leg and bridge member,
 supporting means for the rear end of the bridge member on the bridge member and engaging the interior of the rolling bight portion,
 support means for a lower stretch of the flexible carrier track section along the length of the boom base section, and
 support means for said rigid leg and a top stretch of the flexible carrier track section along the top of the bridge member.

3. In an aerial work platform or the like as defined in claim 2, and supporting and guiding means for the rigid leg and the bridge member on the top of the bridge member and on the boom base section, respectively.

4. In an aerial work platform or the like as defined in claim 2, and said supporting means for the rear end of the bridge member comprising a dual roller assembly on the rear end of the bridge member including upper and lower rollers disposed in a common vertical plane with the rigid leg, bridge member and flexible carrier track section, and the lower roller of the dual roller assembly rolling on and being supported by a lower stretch of the flexible carrier track section ahead of said rolling bight portion.

5. In a carrier track system for a multi-section telescoping boom machine,
 telescopically interfitting boom base, mid and fly sections with the mid and fly sections adapted for simultaneous extension and retraction relative to the base section and relative to each other,
 a rigid leg having a forward end attached to the boom fly section near the forward end of the latter and extending rearwardly along the fly section,
 a bridge member having a forward end attached to the boom mid-section near the forward end of the latter and extending rearwardly along the mid-section,
 a single flexible carrier track section having a top stretch with a forward end attached to the rear end of the rigid leg, having a lower stretch with a rolling bight portion between the lower and top stretches, and having a rear end on the lower stretch attached to the boom base section near the forward end of the latter,
 supporting means for the rear end of the bridge member on the bridge member and engaging the interiors of said lower stretch and said top stretch whereby the rear end of the bridge member is supported by said lower stretch of the flexible carrier track section forwardly of said bight portion,
 support means for the lower stretch of said flexible carrier track section along the bottom of the boom base section, and
 support means for said rigid leg and said top stretch of the flexible carrier track section along the top of the bridge member.

6. In a carrier track system as defined in claim 5, in which said supporting means on the rear end of said bridge member engages the interior of said rolling bight portion.

7. In a carrier track system as defined in claim 5, and support and guidance means for the rigid leg on the bridge member and for the bridge member on the boom base section.

8. In a carrier track system as defined in claim 5, and said support means for the lower stretch of said flexible carrier track section comprising a series of longitudinally spaced support plates on the boom base section, and the support means for said rigid leg and top stretch comprising a series of support rollers on and projecting above the top face of said bridge member.

9. In a carrier track system as defined in claim 5, and said rigid leg and bridge member being disposed laterally outwardly of one side of the interfitting boom sections with the rigid leg disposed above the bridge member in parallel relationship thereto, and the single flexible carrier track section being disposed in and operating in a vertical plane common to the rigid leg and bridge member.

10. In a carrier track system as defined in claim 9, and lateral support arms on corresponding sides of the boom fly and mid sections for said rigid leg and bridge member, respectively.

11. In a carrier track system as defined in claim 10, and a lateral support arm on the boom base section for the rear end of said flexible carrier track section, and guiding and supporting means for said bridge member on the last-named lateral support arm.

12. In a carrier track system as defined in claim 10, and guiding and supporting means for said rigid leg on said bridge member adjacent the forward end of said bridge member.

13. A carrier track system for multi-section telescoping boom machines comprising

- a rigid leg having its forward end fixed to a boom fly section near the forward end of the fly section and extending rearwardly along substantially the entire length of the fly section,
- a carrier track bridge having its forward end fixed to a boom mid-section near the forward end of the mid-section and extending rearwardly along substantially the entire length of the mid-section,
- a single flexible carrier track having an upper stretch with a forward end attached to the rear end of said rigid leg, and having a bottom stretch with a rear end attached to a boom base section near the forward end of the base section, said carrier track including a rolling bight portion,
- a dual guide roller assembly carried by the rear end of said bridge and being engaged with and between the upper stretch and the bottom stretch of said flexible carrier track,
- longitudinally spaced support elements on the boom base section engaging and supporting the bottom stretch of the flexible carrier track, and
- longitudinally spaced support rollers on the top of said bridge engaging and supporting said rigid leg and the upper stretch of said flexible carrier track forwardly of said bight portion.

14. A carrier track system as defined in claim 13, including a device on the boom mid-section near its forward end guidingly supporting said rigid leg during forward and rear movements of the latter.

15. A carrier track system as defined in claim 14, and said device on the boom mid-section being fixed on said carrier track bridge.

16. A carrier track system as defined in claim 15, and the device including a pair of opposite side guide rollers for said rigid leg, a top restraining roller for the rigid leg, and a wear pad engageable with the bottom face of the rigid leg.

17. A carrier track system as defined in claim 13, including a device on the boom base section guidingly engaging and supporting said bridge during forward and rear movements of the latter.

18. A carrier track system as defined in claim 17, and the device on the boom base section including a wear pad engageable with the bottom face of said bridge, and guide and restraint roller means for the bridge disposed above a longitudinal wall of the bridge.

19. A carrier track system as defined in claim 18, and the carrier track bridge having substantially an I-beam cross section and said guide and restraint roller means for the bridge being disposed above a bottom longitudinal web of the bridge and on opposite sides of a center longitudinal web of the bridge.

20. A carrier track system as defined in claim 13, and said rigid leg, carrier track bridge and single flexible carrier track being disposed exteriorly of the multi-section boom, and fixed lateral support arms on the boom fly section, and on the boom mid-section and base section supporting said rigid leg, said bridge and the rear end of the flexible carrier track, respectively.

21. A carrier track system as defined in claim 13, and said longitudinally spaced support elements comprising plate elements fixed to the bottom of the boom base section and projecting laterally of one side wall thereof.

22. A carrier track system as defined in claim 13, and said dual guide roller assembly on the bridge engaged with said bight portion.

* * * * *